US009975597B2

United States Patent
Bossard

(10) Patent No.: US 9,975,597 B2
(45) Date of Patent: May 22, 2018

(54) PNEUMATIC SUSPENSION DEVICE

(71) Applicant: Olivier Bossard, Saint Jean (FR)

(72) Inventor: Olivier Bossard, Saint Jean (FR)

( * ) Notice: Subject to any disclaimer, the term of this patent is extended or adjusted under 35 U.S.C. 154(b) by 76 days.

(21) Appl. No.: 15/135,791

(22) Filed: Apr. 22, 2016

(65) Prior Publication Data

US 2016/0311498 A1  Oct. 27, 2016

(30) Foreign Application Priority Data

Apr. 22, 2015  (FR) .................................... 15 53588

(51) Int. Cl.
| | |
|---|---|
| *B62K 25/06* | (2006.01) |
| *B62K 25/08* | (2006.01) |
| *F16F 9/346* | (2006.01) |
| *F16F 9/36* | (2006.01) |
| *F16F 9/02* | (2006.01) |
| *F16F 9/32* | (2006.01) |
| *F16F 9/48* | (2006.01) |
| *F16F 13/00* | (2006.01) |
| *B62K 25/04* | (2006.01) |

(52) U.S. Cl.
CPC .............. *B62K 25/06* (2013.01); *B62K 25/08* (2013.01); *F16F 9/0209* (2013.01); *F16F 9/0227* (2013.01); *F16F 9/3228* (2013.01); *F16F 9/346* (2013.01); *F16F 9/367* (2013.01); *F16F 9/48* (2013.01); *F16F 13/002* (2013.01); *B62K 2025/044* (2013.01); *B62K 2025/045* (2013.01); *B62K 2025/048* (2013.01)

(58) Field of Classification Search
CPC .. B62K 25/06; B62K 25/08; B62K 2025/044; B62K 2025/045; B62K 2025/048; F16F 9/0209; F16F 9/0227; F16F 9/3228
See application file for complete search history.

(56) References Cited

U.S. PATENT DOCUMENTS

| | | | |
|---|---|---|---|
| 6,592,136 B2 * | 7/2003 | Becker | B62K 25/08 |
| | | | 188/282.1 |
| 8,123,006 B1 | 2/2012 | Schroeder | |
| 2003/0001358 A1 | 1/2003 | Becker et al. | |

(Continued)

FOREIGN PATENT DOCUMENTS

| | | |
|---|---|---|
| EP | 2 267 332 A1 | 12/2010 |
| EP | 2 634 076 A2 | 9/2013 |
| FR | 2 897 915 A1 | 8/2007 |

*Primary Examiner* — Joseph M Rocca
*Assistant Examiner* — Michael R Stabley
(74) *Attorney, Agent, or Firm* — Im IP Law; C. Andrew Im

(57) ABSTRACT

A suspension system includes a body comprising a cylindrical cavity in which a piston is slidably mounted that divides the cylindrical cavity into two working chambers: a lower chamber and an upper chamber, each of which receives a gas. The piston is connected to a piston rod protruding from the cylindrical cavity through a sealing ring. The body slides within an external tube of the suspension system. The external tube is engaged around the piston rod and a lower plug is at its free end to which the end of the piston rod is secured. The space between the lower plug and the sealing ring determines within the external tube a third chamber filled with gas by a preload valve. A single filling valve fills the lower and upper chambers, and a transfer element transfers gas from one of the two working chambers to the other, according to predetermined conditions.

9 Claims, 3 Drawing Sheets

(56) References Cited

U.S. PATENT DOCUMENTS

| | | | | |
|---|---|---|---|---|
| 2010/0175959 A1* | 7/2010 | Becker | .................. | B62K 25/08 188/322.13 |
| 2010/0320655 A1* | 12/2010 | Noguchi | ............... | F16F 9/0218 267/64.11 |
| 2012/0018265 A1* | 1/2012 | Becker | .................. | B62K 25/08 188/314 |
| 2013/0221634 A1* | 8/2013 | Aoki | ..................... | F16F 9/0236 280/276 |
| 2013/0249181 A1* | 9/2013 | Becker | .................. | B62K 25/08 280/124.102 |
| 2013/0341139 A1* | 12/2013 | Noguchi | ............... | F16F 9/0218 188/297 |
| 2014/0182985 A1* | 7/2014 | Ito | ............................ | F16F 9/20 188/313 |

* cited by examiner

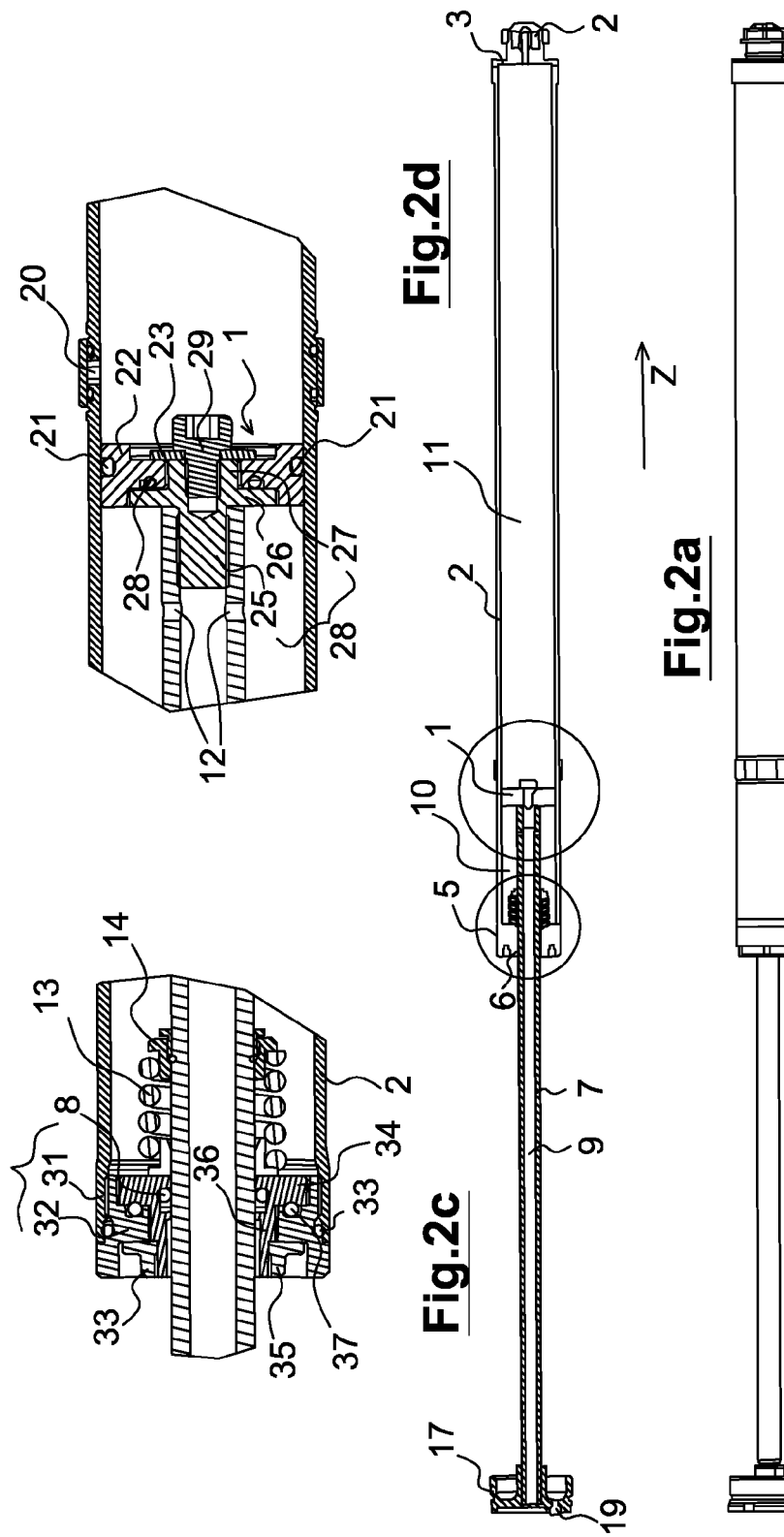

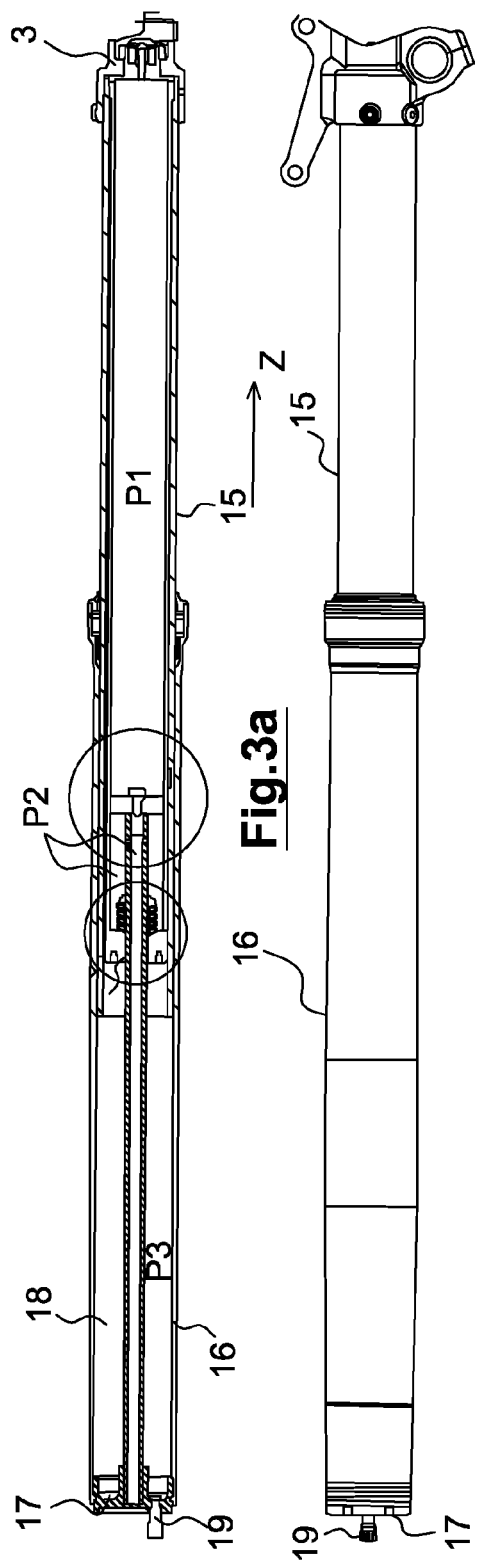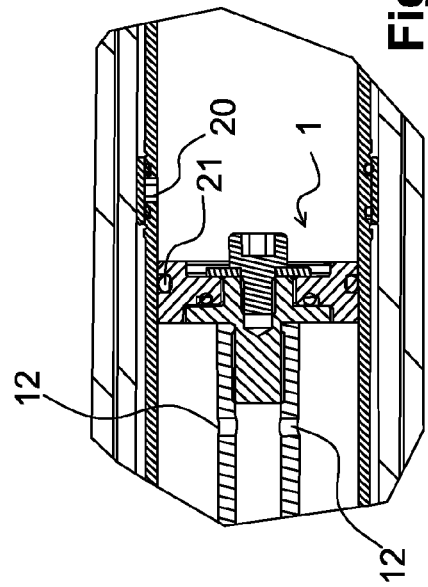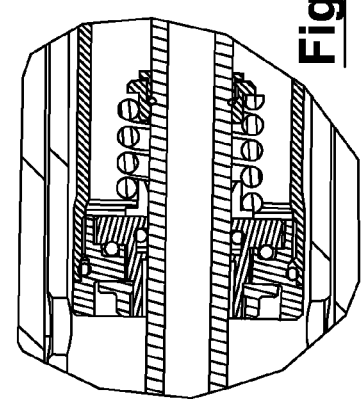

PNEUMATIC SUSPENSION DEVICE

RELATED APPLICATION

This application claims priority from French Patent Application No. 15 53588 filed Apr. 22, 2015, which is incorporated herein by reference in its entirety.

TECHNICAL FIELD

The present invention relates to the field of vehicle equipment.

It relates more particularly to a suspension component that replaces a coil spring typically, although not exclusively, for two-wheeled vehicles of the motorbike or bicycle type.

BACKGROUND OF THE INVENTION

Various suspension devices using, for example, a coaxial spring and hydraulic shock absorber are known in this field. Such devices are, for example, described in patent FR 2 897 915 ("système d'amortissement à détente rapide monté en jambe de force [rapid-relaxation shock absorber system mounted as a strut]") by the same applicant. In the known way, a shock absorber comprises a body of tubular shape the ends of which are closed by walls, and in which a piston extended by a rod that passes through one of the end walls can move in a translational movement, the said piston delimiting two chambers. In the case of a hydraulic shock absorber, bores between the two chambers are commonly provided so as to allow the fluid to pass from one to the other according to predetermined laws. In addition, means are potentially provided to compensate for the variation in volume of the rod.

Such shock absorbers are usually associated with suspension systems, of the coil spring type, which give the suspension an elastic movement function.

Document U.S. Pat. No. 8,123,006 describes a suspension fork including a pneumatic system replacing the coil spring. The suspension fork comprises a body having a cylindrical cavity in which a piston is slidingly engaged and divides said cylindrical cavity into an upper chamber and a lower chamber. An elongated chamber extending longitudinally on the inner surface of the upper chamber, and allows gas transfer between the upper and lower chambers. The elongated chamber is arranged at the lower end of the upper chamber so that gas transfer is achieved when the suspension fork in a maximum extended position. The gas transfer from one room to the other gas enables a pressure balance of gases between the two chambers.

During the passage of the piston opposite to the oblong chamber, the latter is open simultaneously on the lower chamber and on the upper chamber, causing a significant change in stiffness during operation of the suspension system. This variation in stiffness of the suspension system can be detrimental to a user in so far as it may affect the dynamic behavior of the vehicle, causing not only inconvenience in driving comfort, but also accidents.

SUMMARY OF THE INVENTION

The present invention is aimed at a suspension system in which a purely pneumatic system replaces the coil spring yet remains easy to use, with a low number of operational adjustments.

The present invention is also aimed to allow a pressure balance of gases in the internal chambers of a suspension system without the use of filling valve while avoiding variations in stiffness of the suspension system during its use, these variations that could compromise the health and comfort of a user.

It is thus aimed in a first aspect at a suspension system comprising a body provided with a cylindrical cavity in which there is slidably mounted a piston that divides the cylindrical cavity into two working chambers: a lower chamber and an upper chamber each of which receives a gas, the piston being connected to a piston rod protruding from the cylindrical cavity through a sealing ring.

The suspension system moreover comprises an external tube, the body sliding within this external tube, the said external tube being engaged around the piston rod and at its free end comprising a lower plug to which the end of the piston rod is secured, the space between the lower plug of the external tube and the sealing ring determining within the external tube a third chamber filled with gas by a preload valve.

The suspension system comprises a single filling valve for filling the lower and upper chambers, and transfer means for transferring gas from one of the two working chambers to the other, according to predetermined conditions and the gas transfer means are constituted by a lateral chamber provided in the internal wall of the cylindrical body, the said lateral chamber being adapted to come successively in relation to the lower chamber and the upper chamber depending on the position of the piston in the body cylindrical.

Thus, the lateral chamber is never open simultaneously on the lower chamber and the upper chamber, and generates no sudden change of stiffness of the suspension system.

Gas transfer means, to one of the working chambers to the other, advantageously permit the transfer of a very small amount of gas, for example about a few cubic millimeters, when the ambient temperature is about twenty to thirty degrees Celsius, so as to avoid a sudden change in stiffness of the suspension system.

In that way, when the piston moves longitudinally in the internal tube as a result of movements of the vehicle over a road, the lateral chamber will come in succession to face the first and the second internal chamber and will therefore contribute to gradually equalizing the pressures between the two chambers by transporting fluid from the more-pressurized chamber to the less-pressurized chamber.

The lateral chamber is formed in the internal wall of the cylindrical body at any point, depending on the shock absorption law, that is to say, the dynamic behavior, desired by a user.

In one particular embodiment, the chamber has a longitudinal (which means to say in the direction of the axis of a tubes) dimension greater than the thickness of the seal arranged between an external face of the piston and the internal surface of the cylindrical cavity. In that way, the lateral chamber is never open onto the lower chamber and the upper chamber simultaneously, to avoid abrupt changes in stiffness of the suspension system.

The gas transfer is achieved when the seal is opposite the lateral chamber.

In addition, when the lateral chamber is totally opposite the piston, no gas transfer is performed (or the amount of gas transferred is negligible). A predetermined quantity of gas being transferred between the lower and upper chambers, the balancing is performed reliably, without leakage of unwanted gas.

With a view to encouraging the equalizing of the pressures as soon as small-amplitude longitudinal movements are registered by the suspension, the lateral chamber is advantageously, although not necessarily, formed near the position of rest of the piston, which means to say the position it occupies when the vehicle is not moving along.

In a more particular embodiment, the lateral chamber is formed in the cylindrical cavity at a longitudinal distance of less than 10% of the stroke of the piston in the said cylindrical cavity.

In one particular embodiment, the suspension system comprises a spring inserted in the lower chamber and designed to push the piston back toward the upper chamber.

In one particular embodiment, the piston rod is able to accept one or more adjusting shims in the form of longitudinal extensions.

In other words, the invention is notably aimed at a suspension system having coaxial tubes, the said tubes between them determining three pressurized chambers, two of them being internal chambers determined in the internal tube in continuity along the axis, the said two internal chambers being separated by a piston capable of translational movement along the said axis. The system comprises a lateral chamber formed in the wall of the internal tube, the said lateral chamber being designed to come to face the first or the second internal chamber, according to the position of the piston in the internal tube.

In one particular embodiment, the suspension device comprises a valve open onto the upper chamber of the cylindrical cavity and a valve open onto the third chamber (external tube). The valve open onto the upper chamber makes it possible to determine the stiffness of the suspension and the valve open onto the third chamber makes it possible to determine the length of the suspension.

In a particular embodiment, the lateral chamber is formed by a drilling passing through the cylindrical body, combined with the use of an external ring secured to the cylindrical body, and closing the external opening of said through hole.

Advantageously, the external ring is secured to the cylindrical body removably so that it is possible to adjust the pressure of the lower chamber as required, and in particular depressurize this chamber. It should be noted that the open valve on the upper chamber allows adjustment of the pressure of said upper chamber.

The invention is also aimed at a motorbike suspension fork comprising at least one suspension system as explained.

In one particular embodiment, the suspension fork comprises two suspension systems as explained, one of the suspension systems comprising only a valve open onto its upper chamber, and the other suspension system comprising only a valve open onto its third chamber.

In one particular embodiment of the suspension fork provided with two parallel rods, one of the suspension rods is of hydraulic type and the other rod comprises a suspension system as explained.

The invention is further aimed at a vehicle that has shock absorbers to damp suspension travel, these shock absorbers comprising suspension devices as explained hereinabove.

In one particular embodiment, the vehicle is intended for particular use of the all-terrain or sports type.

BRIEF DESCRIPTION OF THE DRAWINGS

The features and advantages of the invention will be better appreciated from the description which follows, which description explains the features of the invention through a nonlimiting exemplary application.

The description is supported by the attached figures which depict:

FIG. 2a: a view in cross section of the two internal tubes of the device,

FIG. 2b: a side view of the two internal tubes of the device,

FIGS. 2c and 2d: detailed views of the cross-sectional view of FIG. 2a,

FIG. 3a: a view in cross section of the set of tubes that forms the suspension,

FIG. 3b: a side view of the set of tubes that forms the suspension, and

FIGS. 3c and 3d: detailed views of the view of FIG. 3a.

DETAILED DESCRIPTION OF ONE EMBODIMENT OF THE INVENTION

Figure 1:
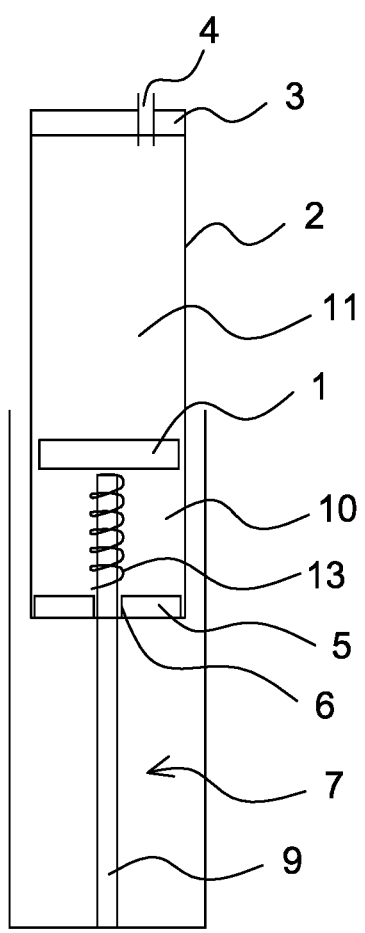
FIG. 1: a schematic diagram of the elements involved in the device.

The invention falls within the context of a vehicle suspension. The example described hereinbelow is that of a motorbike suspension fork. Of course, the suspension system according to the invention may be adapted to any type of vehicle (automobile, motorbike, bicycle, etc.) or any other device. This suspension fork for example comprises a conventional shock absorber system and a pneumatic suspension system described hereinbelow.

As can be seen in FIG. 1, which very schematically illustrates the elements that make up this suspension system, this system is arranged along a main longitudinal axis Z. It will be appreciated that the suspension system is intended to be fixed by one of the ends to a non-suspended part of this vehicle (which part is not illustrated in the figures), for example the wheel, and by its other end to a suspended part (likewise not featured) of the vehicle, for example the chassis. In the present exemplary embodiment, the upper and lower ends of the suspension system are indifferently fixed to the wheel or to the chassis.

As depicted in FIGS. 2a to 2d, the suspension system first of all comprises a piston 1 capable of translational movement along the longitudinal axis Z within a cylindrical body 2. The cylindrical body 2 is closed at its two ends. It is closed at its upper end intended to be secured for example to the chassis of the vehicle (at the top in FIG. 1) by an upper plug 3 provided with an upper valve 4. The cylindrical body 2 is closed on the other hand, at its lower end (at the bottom of the tube in FIG. 1), by an intermediate plug 5 which forms a sealing ring and has a through-bore 6, preferably concentric with the cylindrical body 2, the said intermediate plug 5 being of dimensions suited to the passage of a rigid piston rod 7 connected to the piston 1 at its upper end, the said piston rod 7 being slidably engaged in the said through-bore 6, a sealing element such as an O-ring seal 8 providing sealing around the rod 7 at the bore 6 in the intermediate plug 5. The upper 3 and intermediate 5 plugs are fixed to the cylindrical tube 2 by methods known to those skilled in the art, for example by screwing. Any other method of attachment can, however, be used, and at least one of these plugs 3, 5 may be formed as an integral part of the cylindrical body 2. In the present exemplary embodiment, the piston rod 7 is hollow in so far as it comprises an axial bore (which means to say a bore along the longitudinal axis of the suspension system) 9.

The position of the piston 1 within the cylindrical body 2 thereby determines two working chambers, a lower chamber 10 in which the piston rod 7 notably resides and an upper chamber 11, accessible from the upper valve 4. In the present invention, the lower 10 and upper 11 chambers are filled with gas, for example air or nitrogen or any other gas. It will be appreciated that the movement of the piston 1 in the cylindrical body 2 therefore causes compression in one of the two working chambers 8, 9 and at the same time causes expansion in the other working chamber, depending on the direction in which the said piston 1 moves within the cylindrical body 2.

The piston rod 7 comprises, in the present nonlimiting example, two through-ports 12, perpendicular to the longitudinal axis, and able to place the cavity formed by the axial bore 9 of the piston rod 7 in communication with the lower chamber 10.

A spring 13 is inserted in the lower chamber 10. This spring 13, of the spiral spring type, sits around the piston rod 7. It may bear, on the one hand, against the internal face (which means to say the face facing towards the inside of the cylindrical tube 2) of the intermediate plug 5 and, on the other hand, against a spring cup 14 secured to the piston rod 7.

The effect of this spring 7 is to tend to push the piston 1 back towards the upper chamber 11 when the piston 1 reaches the end of its travel within the cylindrical body 2, namely reaches the vicinity of the intermediate plug 5.

FIGS. 3a to 3d depict one embodiment of a suspension system mounted as a strut between a non-suspended part of a vehicle and a suspended part of the vehicle.

According to the embodiment in FIGS. 3a to 3d, the strut arrangement comprises an internal tube 15 and an external tube 16 which are mounted to slide one inside the other. The strut internal tube 15 is fixed to the cylindrical body 2 at the upper plug 3. The cylindrical body 2 is therefore in this instance inserted inside the internal tube 15 with which it is coaxial. The external tube 16 is slidably mounted around the internal tube 15 and is fixed to the piston rod 7 at the lower plug 17 that accepts the end of this piston rod 7.

It will be appreciated that, by virtue of this arrangement, a third chamber 18 is determined between the intermediate plug 5, the piston rod 7, the lower plug 17 and the internal surface of the external tube 16. This chamber is accessible via a lower valve 19 that passes through the lower plug 17. In this particular embodiment, this third chamber 18 is filled with gas.

According to the gas pressure selected by the user for this third chamber 18, the piston 1 finds itself engaged to a greater or lesser extent in the cylindrical body 2 and therefore pressurizes to a greater or lesser extent the gas inserted in the lower 10 and upper 11 chambers. More specifically, if the third chamber 18 is highly pressurized, the piston 1 will be situated near the upper plug 3 of the cylindrical body 2, the upper chamber 11 will be highly pressurized and the lower chamber 10 less pressurized. Likewise, if the third chamber 18 is weakly pressurized, the piston 1 will be situated near the intermediate plug 3 of the cylindrical body 2, the upper chamber 11 will not be very pressurized and the lower chamber 10 will be highly pressurized. Adjusting the pressure in the third chamber 18 also determines the length of the suspension system at rest.

The cylindrical body 2 here comprises calibrated means for the passage of gas from the lower chamber 10 to the upper chamber 11 or vice-versa, this being according to the movements of the piston 1.

In the present embodiment, the suspension system comprises, on the internal face of the cylindrical body 2, at least one lateral chamber 20 (see notably FIG. 2d) constituting these calibrated means for the passage of gas between the chambers. In this example, illustrated by the figures, a single lateral chamber 20 has been depicted. However, it is permissible to consider any number thereof. As may be seen in this figure, this lateral chamber 20 may be produced in the form of a blind-ended radial bore formed in the wall of the cylindrical body. FIG. 2d illustrates the case of a drilling passing through the cylindrical body 2, combined with the use of an external ring secured to this cylindrical body 2 and closing the external opening of said through-hole. In the present embodiment, the working volume of the lateral chamber 20 is a few millimeters cubed. A higher or lower volume may also be envisaged, depending on the dimensions of the suspension system and the desired operation of this system.

The lateral chamber 20 is dimensioned here in such a way that its length along the longitudinal axis Z is greater than the useful length of an O-ring seal 21 that provides sealing between the lower chamber 10 and the upper chamber 11 at the external face of the piston 1. By way of illustration, the chamber here has a diameter of approximately 2 mm, whereas the surface over which the O-ring seal bears against the internal face of the cylindrical body 2 is less than 1 mm.

In this exemplary embodiment, the lateral chamber 20 is formed in the cylindrical body 2 near the point of rest of the piston 1 in a "normal" setting of the fill of the third chamber 18, namely at a point on the cylindrical body 2 past which the piston 1 will move in each of its oscillations within the said cylindrical body 2.

The materials and dimensions of the various elements given hereinabove are within the competence of a person skilled in the art and thus not considered in greater detail here.

Mode of Operation

In the case of a motorbike, for example, the user of the vehicle will initially set the pressure in the third chamber 18, using the lower valve 19, thus determining the stroke of the piston 1 and the attitude of the motorbike. He will then set the initial pressure prevailing in the upper chamber 11, using the upper valve 4, thus determining the stiffness of the suspension system.

When the vehicle is moving along, which results in vertical movements of the piston 1 within the cylindrical body 2, the piston 12 will move past the lateral chamber 20. Each time it does so, for a moment the duration of which is dependent on the longitudinal speed of the piston 1 in the lateral chamber 20 and on the dimensions of the said lateral chamber 20 relative to the O-ring seal 21, the gas contained in the more-pressurized working chamber 10, 11 can flow by passing along the external face of the piston 1 and into the lateral chamber 20, towards the less-pressurized working chamber 10, 11.

In that way, as the piston 1 moves back and forth in the cylindrical body 2, the pressures in the lower 10 and upper 11 chambers will progressively equalize.

This progressive equalizing function remains effective as the gas expands as a result for example of a heating-up of the suspension system or as a result of environmental conditions.

Advantages

It will be appreciated that the coil spring part of a "conventional" shock absorber is being replaced here by a pneumatic device that provides an elastic response similar to that of a coil spring.

The device described above therefore allows the users to adjust the attitude and the stiffness of the suspension in a simple way using two pressure adjustments, despite there being three pressurized chambers. This mode of adjustment which is simplified to two valves: preload and stiffness, goes against the preconceptions of a person skilled in the art who would consider that, in order to succeed in adjusting all the operating parameters of a three-chamber pneumatic suspension system it would be necessary to adjust the pressures in the three chambers independently and therefore manage three adjusting valves.

It is clear that the invention described can be applied indifferently to motorbike, bicycle, motorcar suspensions or suspensions of any rolling land-based vehicle.

Variations

In an alternative form of embodiment, one of the suspension rods that forms the suspension fork of a motorbike is of hydraulic type, and the other rod is of pneumatic type as described above.

In one alternative form of embodiment, the motorbike suspension fork comprises two suspension systems as described above, one of the suspension systems comprising only a valve open onto the upper chamber and the other suspension system comprising only a valve open onto the third chamber. In this way, adjusting the stiffness and the attitude of the motorbike become even simpler for the user.

In another alternative form of embodiment, the piston rod 7 is able to accept one or more adjusting shims in the form of longitudinal extensions, with the same diameter as the said piston rod 7, for example screwed into the internal bore of this piston rod. These adjusting shims (which have not been illustrated in the figures), of a length which may range for example although nonlimitingly from a few millimeters to a few centimeters, are added to the end of the piston rod 7 if the suspension fork is to be completely relaxed as a result of particular circumstances of use. The neutral position of the piston 1 within the cylindrical body 2 is thus shifted.

The invention claimed is:

1. A suspension system comprising:
   a body provided with a cylindrical cavity in which there is slidably mounted a piston that divides the cylindrical cavity into two working chambers: a lower chamber and an upper chamber, each of which receives a gas, the piston being connected to a piston rod protruding from the cylindrical cavity through a sealing ring;
   an external tube, the body sliding within this external tube, said external tube being engaged around the piston rod and at a free end of said external tube comprising a lower plug to which an end of the piston rod is secured, the space between the lower plug of the external tube and the sealing ring determining within the external tube a third chamber filled with gas by a preload valve;
   a single filling valve to fill the lower and upper chambers, and a gas transfer element to transfer gas from one of the two working chambers to the other, according to predetermined conditions, and wherein the gas transfer element is a lateral chamber formed in an internal wall of the body, said lateral chamber being configured to successively face the lower chamber and the upper chamber depending on a position of the piston in the body; and
   wherein said lateral chamber is formed of a through hole passing through the body, combined with a use of an external ring secured to the body, and closing an external opening of said through hole.

2. The suspension system according to claim 1, wherein said lateral chamber has a longitudinal dimension greater than a thickness of a seal arranged between an external face of the piston and an internal surface of the cylindrical cavity.

3. The suspension system according to claim 1, wherein said lateral chamber is formed near a predetermined rest position of the piston.

4. The suspension system according to claim 3, wherein said lateral chamber is formed in the cylindrical cavity at a longitudinal distance of less than 10% of a stroke of the piston in the said cylindrical cavity.

5. The suspension system according to claim 1, further comprising a spring inserted in the lower chamber and configured to push the piston back toward the upper chamber.

6. The suspension system according to claim 1, wherein the piston rod is configured to accept one or more adjusting shims in a form of longitudinal extensions.

7. A motorbike suspension fork comprising at least one suspension system according to claim 1.

8. A motorbike suspension fork comprising two suspension systems according to claim 1, one of the suspension systems comprising only a valve open onto its upper chamber, and the other suspension system comprising only a valve open onto its third chamber.

9. A motorbike suspension fork comprising two parallel rods, wherein one of the parallel rods of the motorbike suspension fork is of hydraulic type and the other parallel rod comprises a suspension system according to claim 1.

* * * * *